(12) United States Patent
Schankin et al.

(10) Patent No.: US 6,889,803 B2
(45) Date of Patent: May 10, 2005

(54) TORSIONAL ACTIVE VIBRATION CONTROL SYSTEM

(75) Inventors: David Paul Schankin, Harper Woods, MI (US); Mark Norman Ranek, Clarkston, MI (US); Daniel Victor Sagady, Clarkston, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 205 days.

(21) Appl. No.: 10/269,354

(22) Filed: Oct. 11, 2002

(65) Prior Publication Data

US 2004/0069092 A1 Apr. 15, 2004

(51) Int. Cl.[7] .................................................. F16F 7/10
(52) U.S. Cl. ........................ 188/379; 464/180; 74/574; 188/266.7
(58) Field of Search ................................ 188/378, 379, 188/380, 267, 266.1, 266.7; 74/574, 573; 464/180

(56) References Cited

U.S. PATENT DOCUMENTS

| | | |
|---|---|---|
| 3,326,036 A | 6/1967 | Hoeppner |
| 3,726,133 A | 4/1973 | Morgan |
| 3,848,694 A | 11/1974 | Matsui et al. |
| 4,002,043 A | 1/1977 | Yoshida |
| 4,160,390 A | 7/1979 | Spaetgens |
| 4,283,957 A | 8/1981 | Zobrist et al. |
| 4,406,642 A * | 9/1983 | McNall ..................... 464/180 |
| 4,487,592 A | 12/1984 | Strader |
| 4,898,026 A | 2/1990 | Damitz |
| 5,145,025 A | 9/1992 | Damian |
| 5,185,543 A | 2/1993 | Tebbe |
| 5,194,045 A | 3/1993 | Hanke |
| 5,328,408 A | 7/1994 | Wolf et al. |
| 5,352,157 A | 10/1994 | Ochs et al. |
| 5,354,237 A | 10/1994 | Amborn et al. |
| 5,419,192 A | 5/1995 | Maxwell et al. |
| 5,553,514 A | 9/1996 | Walkowc |
| 5,641,904 A | 6/1997 | Kopp et al. |
| 5,660,256 A | 8/1997 | Gallmeyer et al. |
| 5,749,269 A | 5/1998 | Szymanski et al. |
| 5,760,302 A | 6/1998 | Moradi et al. |
| 5,829,319 A * | 11/1998 | Mokeddem .................. 74/574 |
| 5,877,420 A | 3/1999 | Moradi et al. |
| 5,884,902 A | 3/1999 | Hamada et al. |
| 5,921,149 A * | 7/1999 | Masberg et al. .............. 74/574 |
| 5,922,952 A | 7/1999 | Moradi et al. |
| 5,971,859 A | 10/1999 | Runge et al. |
| 5,986,545 A | 11/1999 | Sanada et al. |
| 6,068,555 A | 5/2000 | Andra et al. |
| 6,131,454 A | 10/2000 | Kopp et al. |
| 6,582,125 B1 * | 6/2003 | Kim et al. ................... 384/106 |

FOREIGN PATENT DOCUMENTS

| | | | |
|---|---|---|---|
| JP | 3149412 | * | 6/1991 |
| JP | 20000205251 | * | 7/2000 |

* cited by examiner

*Primary Examiner*—Jack Lavinder
*Assistant Examiner*—Devon Kramer
(74) *Attorney, Agent, or Firm*—Harness, Dickey & Pierce P.L.C.

(57) ABSTRACT

A damper mechanism for absorbing torsional vibrations in a rotating shaft. The damper mechanism includes a vibration absorbing mechanism and at least one actuator that is controllable to affect the torsional vibration absorbing characteristics of the vibration absorbing mechanism.

20 Claims, 2 Drawing Sheets

TORSIONAL ACTIVE VIBRATION CONTROL SYSTEM

FIELD OF THE INVENTION

The present invention generally relates to devices for controlling noise, vibration and harshness (NVH) and more particularly to a device for actively reducing or canceling vibration in a rotating shaft.

BACKGROUND OF THE INVENTION

Propshafts are commonly employed for transmitting power from a rotational power source, such as the output shaft of a vehicle transmission, to a rotatably driven mechanism, such as a differential assembly. As is well known in the art, the torsional loading of the propshaft is rarely uniform over an extended period of time even at relatively constant vehicle speeds and as such, the propshaft is typically subjected to a continually varying torsional load. These variances in the torsional load carried by the propshaft tend to create torsional vibrations which may generate noise in the vehicle drivetrain or vehicle that is undesirable to passengers riding in the vehicle. In especially severe instances, the vibration that is transmitted through the propshaft can generate fatigue in the propshaft and other drivetrain components to thereby shorten the life of the vehicle drivetrain. Thus, it is desirable and advantageous to attenuate vibrations within the propshaft in order to reduce noise and guard against undue fatigue.

It is known in the art to provide tuned torsional vibrations dampers for attachment to shafts, such as crankshafts and propshafts, to attenuate torsional vibrations. This approach, however, has several drawbacks. One such drawback is that these devices are usually tuned to a specific frequency and consequently, will only damp vibrations within a relatively narrow frequency band. Accordingly, these devices are typically employed to effectively damp vibrations at a single critical frequency and offer little or no damping for vibrations which occur at other frequencies.

Another drawback with conventional mechanical damping devices relates to their incorporation into an application, such as an automotive vehicle. Generally speaking, these devices tend to have a relatively large mass, rendering their incorporation into a vehicle difficult due to their weight and overall size. Another concern is that it is frequently not possible to mount these devices in the position at which they would be most effective, as the size of the device will often not permit it to be packaged into the vehicle at a particular location.

SUMMARY OF THE INVENTION

In one preferred form, the present invention provides a dynamic damper mechanism for damping torsional vibration in a shaft. The mechanism includes a damper device having a mass member, an attachment member, a vibration absorbing mechanism and at least one actuator. The attachment member is coupled for rotation with the shaft and the mass member is disposed circumferentially about the attachment member. The vibration absorbing mechanism resiliently couples the mass member to the attachment member and has a torsional vibration absorbing characteristic. The actuator is coupled to the vibration absorbing mechanism and is operable in at least two conditions, with each condition affecting the torsional vibration absorbing characteristic of the vibration absorbing mechanism. The mechanism also includes a first sensor, which is configured to sense a rotational position of the shaft and to generate a position signal in response thereto, as well as a second sensor, which is configured to sense a magnitude of the torsional vibration in the shaft and to generate a vibration signal in response thereto. The controller receives the position signal and the vibration signal and controls the at least one actuator in response thereto to cause the at least one actuator to affect the torsional vibration absorbing characteristic of the vibration absorbing mechanism so as to damp the torsional vibration in the shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
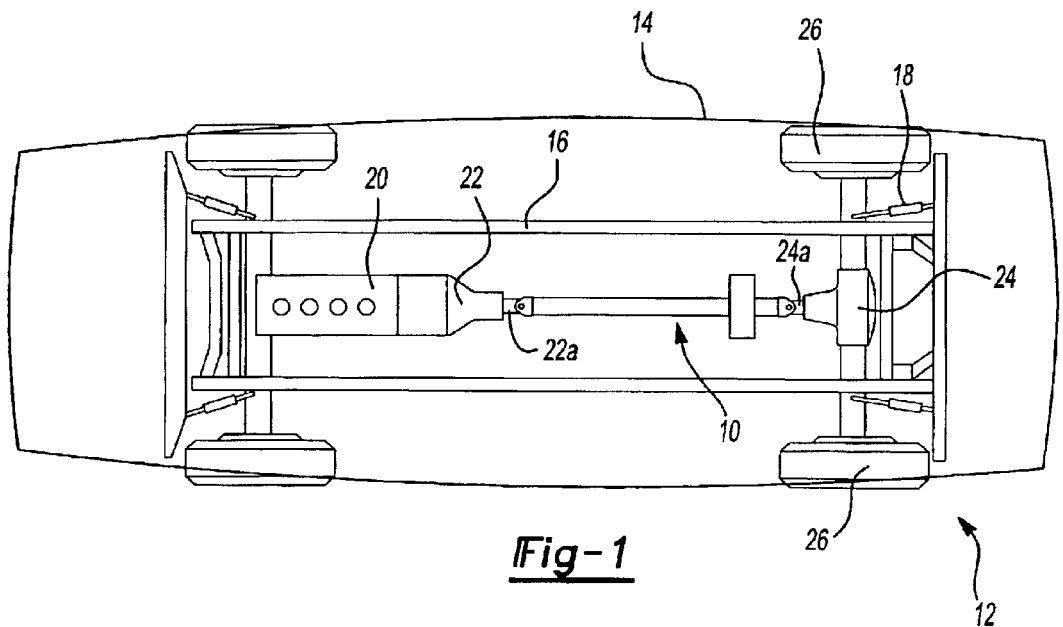
FIG. 1 is a schematic view of an exemplary vehicle having a propshaft assembly constructed in accordance with the teachings of the present invention.

With reference to FIG. 1 of the drawings, a propshaft assembly constructed in accordance with the teachings of the present invention is generally indicated by reference numeral 10. The propshaft assembly 10 is illustrated in operative associate with an exemplary vehicle 12. The vehicle 12 conventionally includes a vehicle body 14, a chassis 16, a suspension system 18, a motor 20, a transmission 22 and an axle assembly 24. As the construction and operation of the vehicle body 14, chassis 16, suspension system 18, motor 20, transmission 22 and axle assembly 24 are well known to those skilled in the art, these components need not be discussed in significant detail.

Briefly, the suspension system 18 resiliently couples the axle assembly 24 to the vehicle chassis 16. The transmission 22, which receives a rotary output from the motor 20, includes a plurality of gear ratios (not specifically shown) that are employed to selectively change the speed ratio of a transmission output shaft 22a. Rotary power is transmitted via the propshaft assembly 10 to the input pinion 24a of an axle assembly 24. The axle assembly 24 operates to selectively direct the rotary power to a pair of drive wheels 26.

Figure 2:
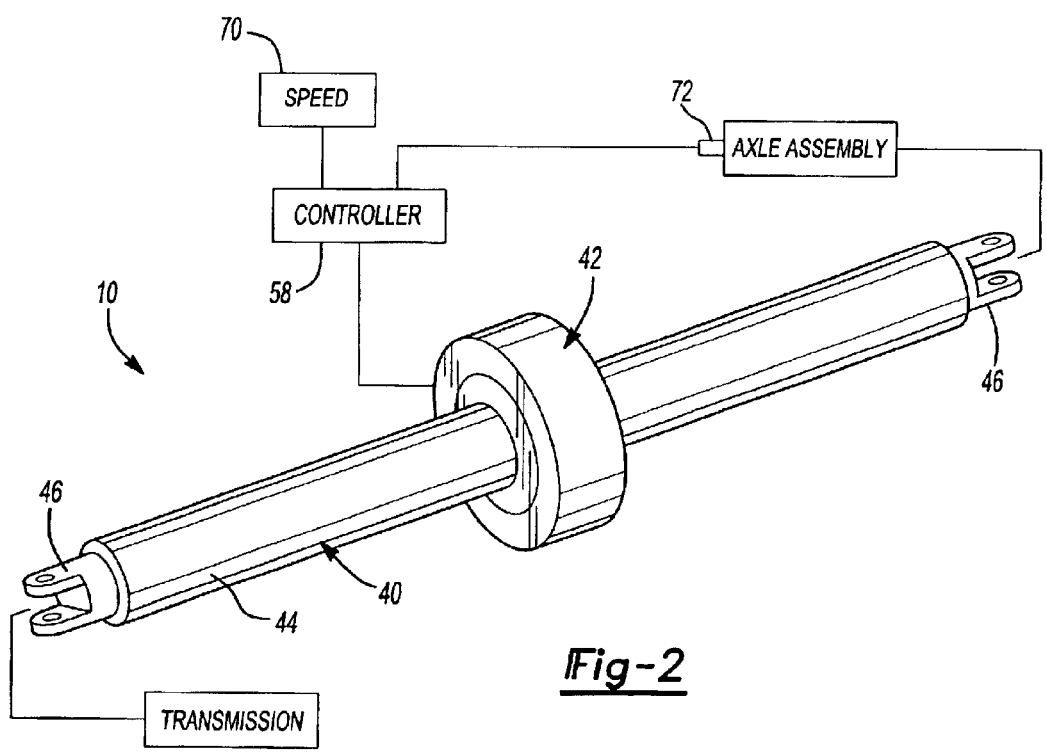
FIG. 2 is a perspective view of the propshaft assembly of FIG. 1.
Figure 3:
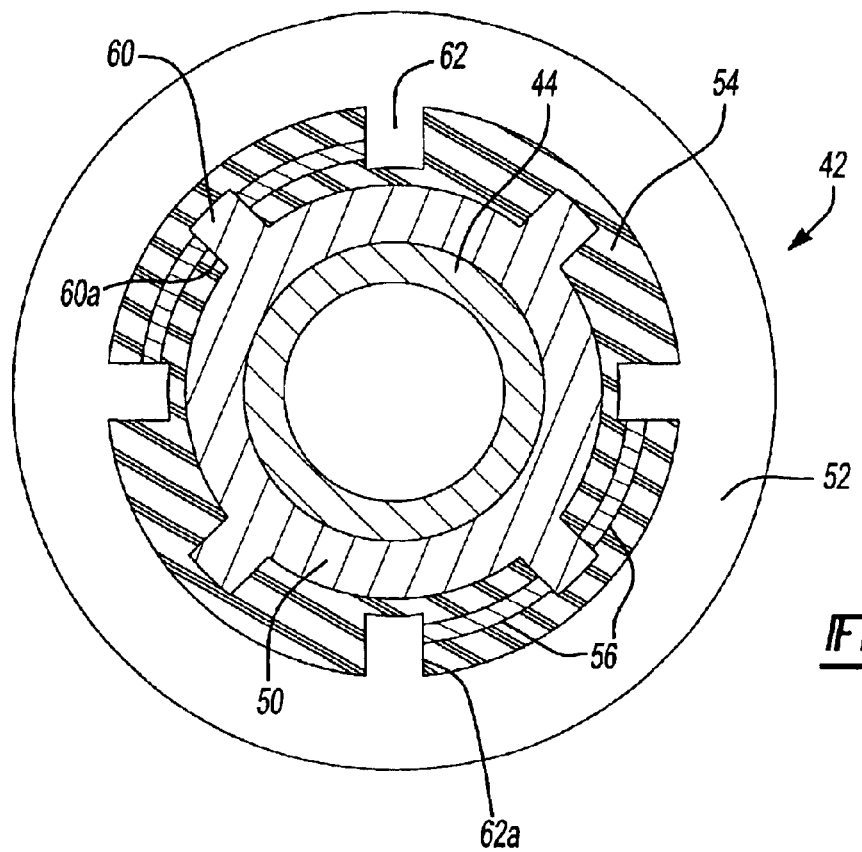
FIG. 3 is an partially broken away front elevation view of the propshaft assembly of FIG. 1.

With additional reference to FIGS. 2 and 3, the propshaft assembly 10 includes a propshaft 40 and a dynamic damper mechanism 42. The propshaft 40 includes a tubular body 44 and a pair of conventional spider assemblies 46. The spider assemblies 46 are coupled the opposite ends of the tubular body 44 and permit the propshaft 40 to be coupled to the transmission output shaft 22a and the input pinion 24a in a conventional manner.

The dynamic damper mechanism 42 includes an inner ring 50, an outer ring 52, a resilient coupling 54, an actuator 56 and a controller 58. The inner ring 50 is coupled for rotation with the tubular body 44 of the propshaft 40 by any conventional process, including fastening, welding, bonding and/or an interference fit (e.g. press fit or shrink fit). The outer diameter of the inner ring 50 includes a plurality of circumferentially-spaced lugs 60 that extend outwardly toward the outer ring 52.

The outer ring 52 is concentrically disposed around the inner ring 50 and includes a sufficient amount of mass to accomplish the cancellation of vibration as will be discussed in detail, below. The inner side of the outer ring 52 includes a plurality of circumferentially-extending lugs 62 that extend radially inwardly toward the inner ring 50. Each of the lugs 62 is disposed between a pair of the lugs 60. The lugs 60 and 62 do not extend in so far in a radial direction that they contact the outer or inner ring 52 or 50, respectively.

The resilient coupling 54 maintains the concentric positioning of the outer ring 52 relative to the inner ring 50. The resilient coupling 54 may include a plurality of compression springs or may be an elastomeric material as is shown in the example provided.

One or more actuators 56 are disposed between the inner and outer rings 50 and 52 and in contact with the mutually opposed faces 60a and 62a of the lugs 60 and 62, respectively. The actuators 56 may use any appropriate means to extend and retract between the faces 60a and 62a, but in the particular embodiment provided, the actuators includes a magnetostrictive member whose length may be changed by varying the magnitude of an electrical charge that is applied to it. The controller 58 is electrically coupled to the actuators 56 and is operable for selectively controlling the charge that is applied to the magnetostrictive member.

During the operation of the propshaft assembly 10, the spring rate of the resilient coupling permits the outer ring 52 to damp vibrations within a predetermined frequency band. The controller 58, however, may be employed to extend or retract the actuators 56 to change the tangentially applied load on the resilient coupling 54 to thereby affect the spring rate of the resilient coupling 54. Those skilled in the art will appreciate that the actuators 56 may be controlled so as to cancel-out torsional vibrations entering the axle assembly 24. More preferably, however, the actuators 56 are controlled so as to cancel out vibration that is generated by the axle assembly 24, including vibration that is generated by the meshing of the ring gear (not shown) and pinion axle gears (not shown). As this vibration is typically a function of the rotational speed of the propshaft 40, the response of the controller 58 to a given propshaft rotational speed may be preprogrammed in a look-up table 70. The controller 58 may utilize the existing vehicle sensors (not shown) and in-vehicle network (not shown) to determine the rotational speed of the propshaft 40 and thereafter control the actuators 56 according to the parameters found in the look-up table 70.

Alternatively, the controller 58 may include one or more vibration sensors 72 that are coupled to portions of the vehicle (e.g., the axle assembly 24). The vibration sensors 72 are operable for producing a vibration signal in response to sensed vibrations. The controller 58 responsively controls the actuators 56 so as to generate vibrations that are of sufficient amplitude and shifted in phase to cancel out the vibrations that are sensed by the vibration sensors 72.

Figure 4:
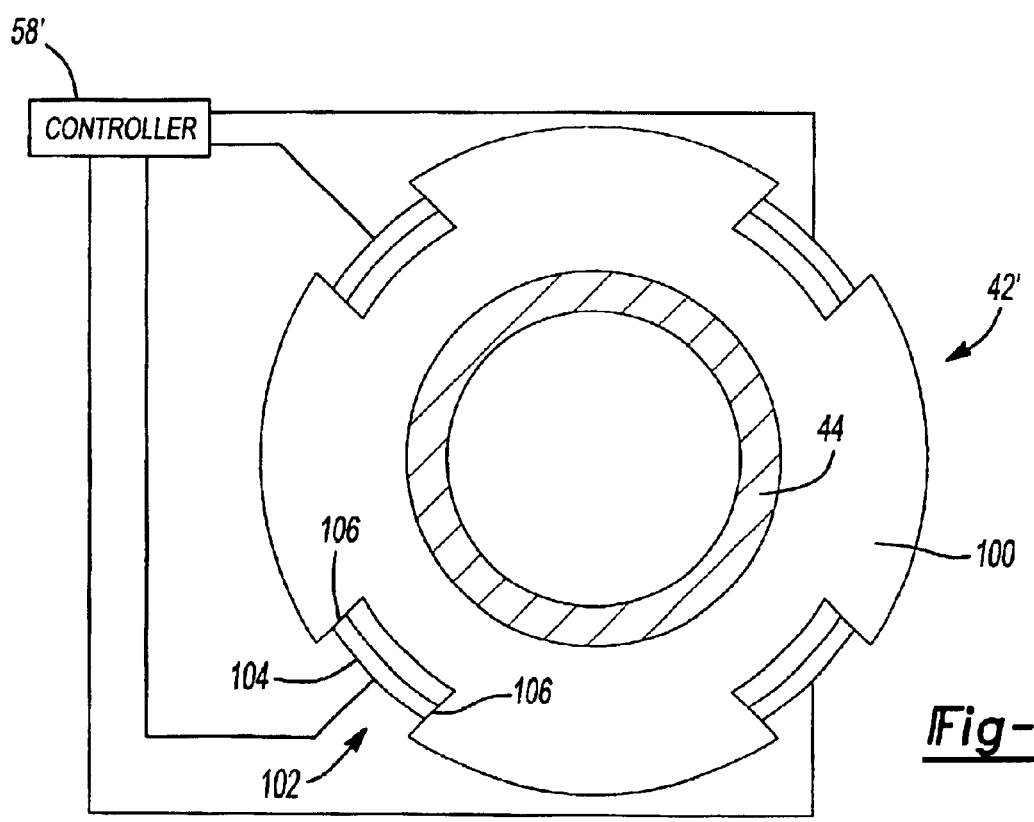
FIG. 4 is a partially broken away front elevation view of a propshaft assembly constructed in accordance with the teachings of an alternate embodiment of the present invention.

While the propshaft assembly 10 has been described thus far as including a dynamic damper mechanism 42 that includes a resilient coupling that connects a pair of concentric rings, those skilled in the art will appreciate that the present invention, in its broader aspects, may be constructed somewhat differently. As illustrated in FIG. 4 for example, the dynamic damper mechanism 42 may be constructed with a single ring 100 having a plurality of pockets 102 and a plurality of actuators 104. The pockets 102, which are circumferentially spaced apart from one another, include a pair of opposite faces 106.

Each actuator 104 is disposed in a pocket 102 between the faces 106 and is selectively controllable to expand or contract in a direction that is approximately tangential to the point at which it is mounted in the ring 100. The actuators 104 may use any appropriate means to extend and retract between the faces 106, but in the particular embodiment provided, the actuators 104 include a magnetostrictive member whose length may be changed by varying the magnitude of an electrical charge that is applied to the magnetostrictive member. The controller 58 is electrically coupled to the actuators 104 and is operable for selectively controlling the charge that is applied to the magnetostrictive member.

The controller 58 controls the simultaneous actuation (i.e., expansion or retraction) of the actuators 104 to torsionally excite the ring 100. Like the dynamic damper mechanism 42, the actuators 104 of the dynamic damper mechanism 42 may be controlled in a predetermined manner, such as based on the rotational speed of the propshaft 40, for example, or in response to one or more vibration signals that are generated by an associated vibration sensor.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A dynamic damper mechanism for damping torsional vibration in a shaft, the dynamic damper mechanism comprising:

a damper device having a mass member, an attachment member, a vibration absorbing mechanism and at least one actuator, the attachment member being adapted to be coupled for rotation with the shaft, the mass member being disposed circumferentially about the attachment member, the vibration absorbing mechanism resiliently coupling the mass member to the attachment member and having a torsional vibration absorbing characteristic, the actuator being coupled to the vibration absorbing mechanism and being operable in at least two conditions, each condition affecting the torsional vibration absorbing characteristic of the vibration absorbing mechanism;

a first sensor that is adapted to sense a rotational position of the shaft and generate a position signal in response thereto;

a second sensor that is adapted to sense a magnitude of the torsional vibration in the shaft and generate a vibration signal in response thereto; and a controller coupled to the first and second sensors and the at least one actuator, the controller receiving the position signal and the vibration signal and controlling the at least one actuator in response thereto to cause the at least one actuator to affect the torsional vibration absorbing characteristic of the vibration absorbing mechanism so as to damp the torsional vibration in the shaft.

2. The dynamic damper mechanism of claim 1, wherein the actuator includes a magnostrictive member having a dimension that varies in accordance with a control signal that is produced by the controller.

3. The dynamic damper mechanism of claim 2, wherein the vibration damping mechanism includes a resilient member that extends radially outwardly between the attachment member and the mass member in a compressed state, the magnostrictive member being operable for varying a degree to which the resilient member is compressed.

4. The dynamic damper mechanism of claim 3, further comprising a plurality of second resilient members, each of the second resilient members extending radially outwardly between the attachment member and the mass member in a compressed state and circumferentially spaced apart from one another and the resilient member.

5. The dynamic damper mechanism of claim 4, wherein a second magnostrictive member is coupled to each of the second resilient members, each of the second magnostrictive members being operable for varying a degree to which an associated one of the second resilient members is compressed.

6. The dynamic damper mechanism of claim 5, wherein the controller is operable for controlling the magnostrictive member and each of the second magnostrictive members on an individual basis.

7. The dynamic damper mechanism of claim 4, wherein the second resilient members are formed from an elastomeric material.

8. The dynamic damper mechanism of claim 3, wherein the resilient member is formed from an elastomeric material.

9. The dynamic damper mechanism of claim 2, wherein the vibration damping mechanism includes a first resilient member and a second resilient member, each of the first and second resilient members being configured to exert a force in a tangential direction, the first and second resilient members being spaced apart from one another with one of the magnostrictive member, the attachment member and the mass member being disposed therebetween.

10. The dynamic damper mechanism of claim 9, wherein at least one of the first and second resilient members is a spring.

11. The dynamic damper mechanism of claim 10, wherein the spring is a coil spring.

12. The dynamic damper mechanism of claim 9, wherein at least one of the first and second resilient members is formed from an elastomeric material.

13. A shaft assembly for transmitting rotary power, the shaft assembly comprising:

a shaft structure;

a damper device having a mass member, an attachment member, a vibration absorbing mechanism and at least one actuator, the attachment member being adapted to be coupled for rotation with the shaft structure, the mass member being disposed circumferentially about the attachment member, the vibration absorbing mechanism resiliently coupling the mass member to the attachment member and having a torsional vibration absorbing characteristic, the actuator being coupled to the vibration absorbing mechanism and being operable in at least two conditions, each condition affecting the torsional vibration absorbing characteristic of the vibration absorbing mechanism;

a first sensor for sensing a rotational position of the shaft and generating a position signal in response thereto;

a second sensor for sensing a magnitude of torsional vibration in the shaft and generating a vibration signal in response thereto; and a controller coupled to the first and second sensors and the at least one actuator, the controller receiving the position signal and the vibration signal and controlling the at least one actuator in response thereto to cause the at least one actuator to affect the torsional vibration absorbing characteristic of the vibration absorbing mechanism so as to damp the torsional vibration in the shaft structure.

14. The shaft assembly of claim 13, wherein the actuator includes a magnostrictive member having a dimension that varies in accordance with a control signal that is produced by the controller.

15. The shaft assembly of claim 14, wherein the vibration damping mechanism includes a resilient member that extends radially outwardly between the attachment member and the mass member in a compressed state, the magnostrictive member being operable for varying a degree to which the resilient member is compressed.

16. The shaft assembly of claim 13, wherein the vibration damping mechanism includes a first resilient member and a second resilient member, each of the first and second resilient members being configured to exert a force in a tangential direction, the first and second resilient members being spaced apart from one another with one of the magnostrictive member, the attachment member and the mass member being disposed therebetween.

17. A shaft assembly for transmitting rotary power, the shaft assembly comprising:

a shaft structure;

a damper device having a mass member, an attachment member a vibration absorbing mechanism and at least one actuator, the mass member being disposed circumferentially about the shaft structure, the vibration absorbing mechanism resiliently coupling the mass member to the shaft structure and having a torsional vibration absorbing characteristic, the actuator being coupled to the vibration absorbing mechanism and being operable in at least two conditions, each condition affecting the torsional vibration absorbing characteristic of the vibration absorbing mechanism;

a first sensor for sensing a rotational position of the shaft and generating a position signal in response thereto;

a second sensor for sensing a magnitude of the torsional vibration in the shaft and generating a vibration signal in response thereto; and a controller coupled to the first and second sensors and the at least one actuator, the controller receiving the position signal and the vibration signal and controlling the at least one actuator in response thereto to cause the at least one actuator to affect the torsional vibration absorbing characteristic of the vibration absorbing mechanism so as to damp the torsional vibration in the shaft structure.

18. The shaft assembly of claim 17, wherein the actuator includes a magnostrictive member having a dimension that varies in accordance with a control signal that is produced by the controller.

19. The shaft assembly of claim 18, wherein the vibration damping mechanism includes a resilient member that extends radially outwardly between the attachment member and the mass member in a compressed state, the magnostrictive member being operable for varying a degree to which the resilient member is compressed.

20. The shaft assembly of claim 18, wherein the vibration damping mechanism includes a first resilient member and a second resilient member, each of the first and second resilient members being configured to exert a force in a tangential direction, the first and second resilient members being spaced apart from one another and being disposed on opposite sides of one of the magnostrictive member, the mass member and a radially extending member that is fixedly coupled for rotation with the shaft structure.

* * * * *